United States Patent

[11] 3,542,481

| [72] | Inventor | Albert F. Slomba<br>Ridgefield, Connecticut |
|---|---|---|
| [21] | Appl. No. | 611,009 |
| [22] | Filed | Jan. 23, 1967 |
| [45] | Patented | Nov. 24, 1970 |
| [73] | Assignee | The Perkin-Elmer Corporation<br>Norwalk, Connecticut<br>a corporation of New York |

[54] SAMPLING ARRANGEMENT FOR RAMAN SCATTERING CELLS
7 Claims, 2 Drawing Figs.

[52] U.S. Cl. .................................................. 356/244, 356/75
[51] Int. Cl. ..................................................... G01n 21/16
[50] Field of Search .......................................... 356/103, 104, 75, 36, 244

[56] References Cited
UNITED STATES PATENTS
2,549,574  4/1951  Condiff ........................ 356/246

3,414,354  12/1968  Siegler ........................ 356/75
3,442,591  5/1969  Ogura ........................ 356/75
2,940,355  6/1960  Cary ........................ 356/75

OTHER REFERENCES
"A Multiple-Pass Raman Cell for Liquids," Tunnicliff et al., Spectrochimica Acta, vol. 18, 1962, p. 572-74.
"Raman Spectroscopy Using a Gas Laser," Russell Le Journal De Physique, Nov. 1965, p. 620-23.

Primary Examiner—Ronald L. Wibert
Assistant Examiner—Vincent P. McGraw
Attorney—Edward R. Hyde, Jr.

ABSTRACT: A Raman sample cell arrangement, suitable for laser excitation of powdered samples, includes a long, thin sample-receiving bore surrounded by reflective walls, except for a laser beam entry aperture and a Raman exit slit. A relatively high ratio of Raman-to-excitation energy at the small exit slit is therefore obtained. The two-piece cell may be filled by introducing and tamping down the powdered material through the laser beam entrance aperture.

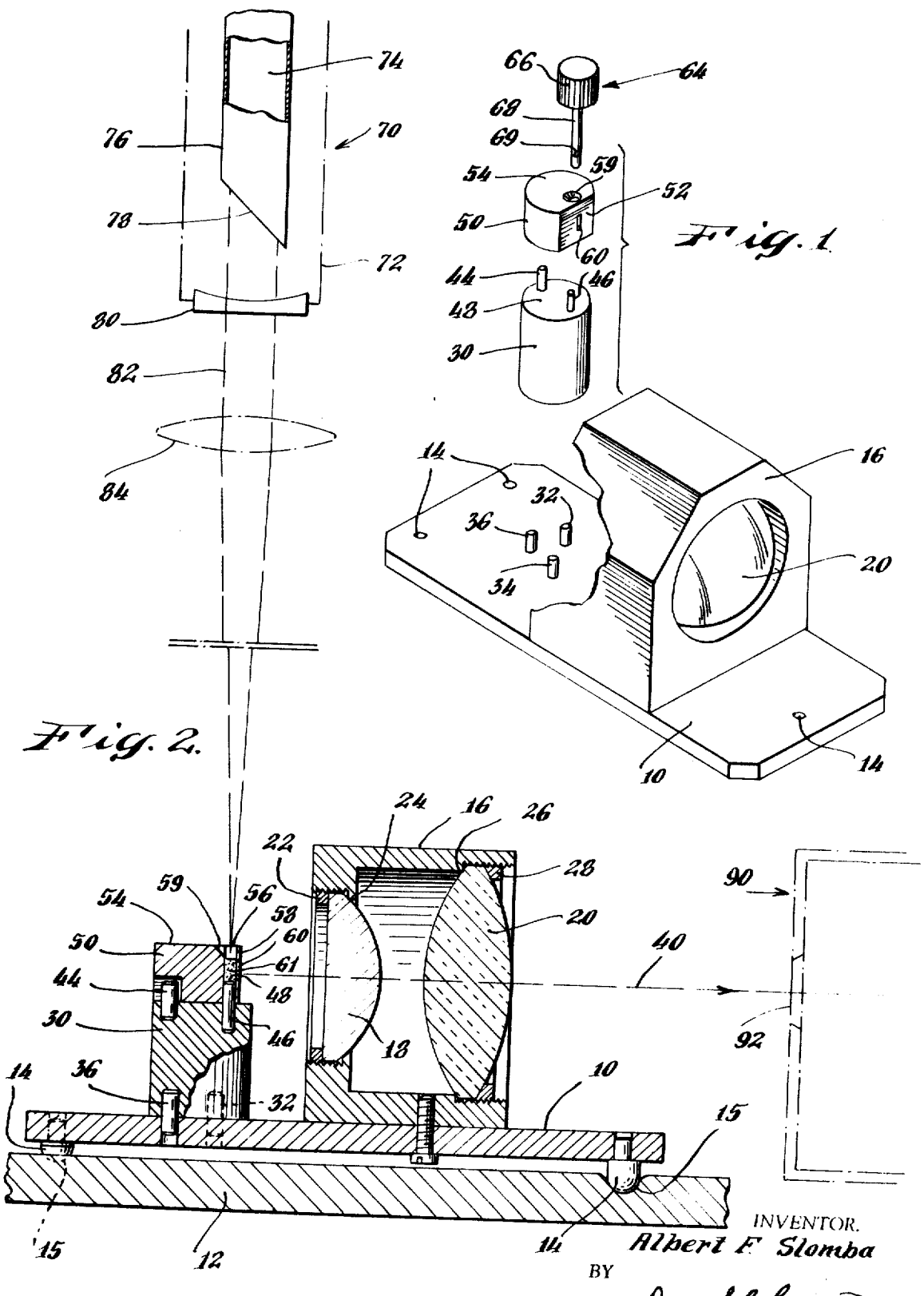

SAMPLING ARRANGEMENT FOR RAMAN SCATTERING CELLS

This invention relates to sample cells. In particular the invention provides a cell for solid sample materials, especially suitable for use in Raman spectroscopy.

Raman spectroscopy is a now well-known spectrometric technique, and is usually performed on samples which are in a liquid state (typically an original solid sample dissolved in a liquid solvent), but certain characteristic lines of the spectra of a solid material are destroyed when the material is dissolved (for example, the crystal lattice vibration). Because of the relatively high intensity of Rayleigh scattering of the excitation beam caused by particulate material, up until the time of the present invention it has been generally necessary to specially treat powdered solid sample materials in order to utilize them in Raman spectroscopy. Typically this comprised grinding the original solid material to an extremely fine powder and then forming a relatively homogeneous pellet therefrom by compression, usually after the additional steps of adding and mixing with a flux or solvent (for example, potassium bromide). Various techniques have been suggested for reducing the Rayleigh scattering, particularly from the surfaces of such pellets (which may vary in form from long, relatively thin rods to quite thin tablets or discs). Both the additional steps required for sample preparation and the often cumbersome sample and optical relationships required in the spectrometer have been detrimental to the wide usage of Raman spectroscopy with solid sample materials.

The present invention provides a sample cell assembly, especially adapted for use with a narrow, extremely high intensity excitation beam (as may be obtained from a laser), which reduces the amount of Rayleigh scattered excitation energy undesirably collected while enhancing the effective intensity of the excitation energy within the solid sample. Additionally the invention eliminates the need for specially treating particulate sample materials prior to analysis, since the powdered material may be directly introduced into the cell.

An object of the invention is the provision of a Raman sampling arrangement affording high excitation energy within the solid sample and relatively low excitation energy in the collected Raman reradiation.

An additional object of the invention is the provision of a sample cell assembly and associated technique for greatly simplifying the optical arrangement of the Raman spectrometer for analysis of solid sample material.

Another object of the invention is the provision of a sample cell for Raman spectroscopy, which is directly usable with powdered sample materials without any special sample preparation.

A further object of the invention is to provide a sample cell for use in Raman spectroscopy of solid sample materials, which cell is easy to use, readily cleaned, and substantially maintenance free.

Other objects, features and advantages of the invention will be obvious to one skilled in the art upon reading the following detailed specification, in conjunction with the accompanying drawings, in which:

FIG. 1 is a perspective view showing a complete sample cell assembly according to the invention in separated (i.e., "exploded") condition; and FIG. 2 is a vertical cross section through the sample cell assembly and the immediately adjacent parts of a Raman spectrometer in which it is used.

FIG. 1 shows the entire sample cell and Raman radiation-gathering optical assembly, which is especially adapted to be utilized directly in existing Raman spectrometers utilizing a laser excitation source. To facilitate this ready incorporation, the entire assembly is mounted on a support plate 10, which is adapted for kinematic connection to a frame member 12 (see FIG. 2) of the spectrometer. Correct alinement of the support plate 10 with the rest of the instrument may be assured by the use of, say, three locating spherically convex feet 14 engaging concave indentations 15 in the upper surface of member 12. The sample assembly support plate 10 carries a lens support 16, which in turn contains the Raman radiation-gathering optical system, illustrated as a pair of converging lenses 18, 20 (mounted within lens support 16 by means, for example, of shoulders 24 and 26 and conventional retaining rings 22 and 28).

The lower cylindrically-shaped part 30 of the sample subassembly is removably mounted on support plate 10 by means, for example, of three locating studs 32, 34 and 36, which enter apertures in the base of part 30. Preferably studs 32—36 either form a scalene triangle or else differ in either diameter or cross-sectional shape, so as to assure that lower part 30 may be connected to supporting plate 10 in only one particular position of orientation. Suitable releasable fastening means may be provided for securing lower sample cell part 30 to support plate 10 and/or for securing plate 10 to the spectrometer frame member 12, if desired.

The other major part of the sample subassembly comprises the upper part or sample cell proper 50. Part 50 may be precisely located relative to part 30 by the use of at least two (preferably nonidentical) locating studs 44 and 46 (which are rigidly connected to part 30) and cooperating apertures in the lower surface of upper part 50. The upper surface 48 of one of the studs 46 is highly polished, so as to be reflective, since it forms the bottom surface of the sample chamber, as will appear hereinafter. As may best be seen in FIG. 1, the upper sample cell part 50 has the general form resulting from cutting a small part of a solid cylinder by means of a plane parallel to the cylindrical axis and at a distance therefrom only moderately less than the radius of the cylinder. There therefore results a flat vertical surface 52, in addition to the flat upper (54) and lower surfaces.

A cylindrical bore 56 extends vertically through the entire cell 50, so as to be parallel to but displaced from the cylindrical axis thereof. The adjacent interior wall surface of bore 56 is only slightly removed from being tangent to vertical flat exterior surface 52, so that at the closest point of approach of bore 56 to wall 52, only a relatively thin wall 58 (see FIG. 2) remains therebetween. This thin wall 58 is partly removed so as to form a relatively narrow vertical slit 60 (compare FIGS. 1 and 2), so as to form the viewing or exit slit for the Raman radiation. The entire interior surfaces forming bore 56 (as well as the top surface 48 of stud 46) are highly polished so as to form a smooth mirror surface.

A packing or tamping device 64 is shown in FIG. 2. Tamping device 64 comprises a knurled, generally cylindrical handle portion 66, to which is rigidly attached a round depending rod 68. The diameter of rod 68 is very slightly smaller than the internal diameter of bore 56 so that rod 68 will fit therein with only sufficient clearance to allow movement of the rod 68 in the bore 56. Thus after a powdered sample material has been placed within the bore 56, tamping device 64 may be introduced into the top of bore 56 so as to pack the solid material into a more compressed mass, as will be explained more fully hereinafter.

In FIG. 2 the immediately adjacent parts of the Raman spectrometer are shown so as to assist in understanding the operation of the invention. The excitation source for the Raman spectrometer is a laser 70 schematically indicated to be contained within the broken line box 72. As is well known, such a laser includes a means for pumping energy into a lasing medium, which may be for example a gas within the interior 74 of a tube 76 having highly transmitting end windows, the lower one of which is indicated at 78. The laser will also comprise a pair of end reflectors, only the lower one of which is indicated at 80. As is now well understood, these reflectors will return most of the radiation falling thereon back into the resonant cavity of the laser but will allow a certain relatively small percentage to leave the resonant cavity by passing through the reflector (which conventionally comprises a transparent medium onto which a series of carefully controlled fractional wavelength dielectric layers have been coated). Various configurations of such end reflectors are now known, but it will be assumed that the particular configuration causes the laser beam at the lower surface of end reflector 80 at 82 to be collimated (i.e., all rays substantially parallel to each other and the axis of the laser). If the diameter of this collimated beam at 82 is substantially larger than the diameter of the sample receiving bore 56, an additional optical element schematically illustrated as a lens) 84 may be placed in the collimated beam so as to cause at least a partial convergence thereof. Ideally the beam entering the upper end of bore 56 should be just slightly smaller in diameter so that the entire beam enters the bore and completely irradiates the sample.

The reflective nature of the interior walls forming bore 56 (and of the upper surface 48 of stud 46 forming the bottom of the sample cell cavity) cause much of the exciting laser radiation which is scattered by the particles of compressed sample 61 to be redirected back toward the sample. In addition the reflective surface 48 causes return of those rays of the laser beam not so scattered at least once back through the sample material 61. Similarly the reflective nature of the interior of the cavity causes at least some of the resulting Raman radiation which would otherwise be lost to be reflected within the cavity until it reaches the exit slit 60. Much of the Raman radiation (plus of course some of the original laser radiation which has been merely scattered by the Rayleigh or Tyndall effect) leaving slit 60 will be gathered by the optical system (comprising for example lenses 18 and 20) so as to be imaged into the entrance slit 92 of the monochromator, schematically indicated at 90. Preferably slit 60 is similar in shape to slit 92; and lenses 18 and 20 image slit 60 onto slit 92 at such magnification as to fill the latter. As is well understood, the intensity of this Raman radiation at various wavelengths is determined by means of scanning the dispersion element of the monochromator and detecting the intensity thereof over a particular wavelength range near the wavelength of the exciting source (i.e., the wavelength of the monochromatic laser beam 82).

In using the invention, the operator would position the main support plate 10 as shown in FIG. 2 (if not already so positioned) including all the elements directly or indirectly attached thereto (namely, 16—60). Bore 56 (including the wall surfaces thereof) and at least the upper surface 48 of pin 46 should be as clean as possible before use of the sampling device; the separability of upper part 50 from lower part 30 (and its separability in turn from the support plate 10) facilitates this cleaning either before or after all of the elements (10, and 16—60) have been placed in the positions shown in FIG. 2. The cylindrical shape of the bore 56 and the fact that it goes completely through upper sample cell part 50 simplifies this cleaning; for example, once upper part 50 has been separated from lower part 30, the rod 68 of the tamping device 64 may be passed completely through bore 56, thus removing any substantial size particles therefrom. Further cleaning may be accomplished by use of a thin brush, placing the upper cell part 50 in a suitably solvent (as may be done with lower part 30), or any other conventional cleaning technique.

The clean parts (50 and 30) are then reassembled as shown in FIG. 2. The solid sample is then introduced into the open top end of bore 56; preferably this open end is tapered or funnel-shaped as indicated at 59 to facilitate the introduction of powdered material. The sample is then compressed or tamped by utilizing device 64. The lowermost part of slit 60 is somewhat above the upper reflective surface 48 of stud 46 (i.e., closely adjacent but slightly above the lower extremity of the sample material 61). The upper edge of slit 60 should be just below the upper surface of the compressed sample 61. When the lower surface 67 of the tamping device 64 (and therefore the upper surface of the compacted sample material) is at this desired location, a scribe line 69 on depending rod 68 will be even with flat surface 54 of part 50. This assists the operator in determining whether a correct amount of the sample material is present in the cell bore. Depending on the fineness of the original sample powder, some may be pushed into (and in some cases through) slit 16. Such excess material may be removed from the slit by the use of any conventional pointed instrument (such as the tip of the prongs of a tweezer).

Because both parts (30 and 50) of the cell may be removed and replaced together, even the loading of the solid material may be accomplished with these parts connected to each other and separated from main support plate 10. This construction therefore allows not only cleaning of the cell, but also the loading of sample material therein, outside of the instrument. Thus the provision of one or more additional sample cells (i.e., parts 30 and 50) will allow substantially maximum utilization of the spectrometer, since cleaning and sample loading of one cell may be accomplished while the spectrometer is analyzing the sample contained in a different cell.

Because both the diameter of the bore 56 and the laser excitation beam are extremely small, the volume of sample required is also extremely small, and the excitation radiation flux density will be extremely high. The relatively short (vertical) path of the beam through the sample, the compactness of the sample, and the reflective walls almost surrounding the sample all contribute to maintaining the flux density within the sample at a high level. The reflectivity of the interior surfaces of the sample cavity (i.e., the wall defining bore 56 and the upper surface 48 of stud 46) increases the amount of Raman radiation which will ultimately emerge from slit 60. Thus this reflectivity accomplishes the double purpose of effectively enhancing both the excitation energy level and the collected part of the Raman radiation.

The relative position of the small exit slit 60 assists in minimizing the amount of excitation radiation which falls within the field angle of the gathering system (e.g., lens elements 18 and 20) so as to be reimaged into the monochromator entrance slit (92). First, the positioning of the slit 60 at the side of the cell inhibits any unscattered laser radiation from directly reaching lens 18. Secondly, the fact that the upper part of the slit is below the upper surface of the sample minimizes the amount of laser radiation form the scattering (diffuse reflection) at the sample upper surface which will be gathered by lenses 18 and 20, since even the radiation scattered to the right (in FIG. 2) will not in general pass through slit 60 to lens 18, and any that does will have to pass through at least some part of the sample. Similarly, the positioning of the lower edge of slit 60 slightly above the lower surface (at upper reflective surface 48 of pin 46) of the sample substantially inhibits collection of both laser radiation that is scattered at this surface generally to the right, and already scattered laser radiation that is reflected at surface 48 in the same general direction. Since bore 56 is of small diameter, only a very small amount of sample material need be "wasted" to accomplish this substantial avoidance of surface scatter collection.

Although the exact sizes of various parts of sample cell are not critical, the following exemplary dimensions are given for a cell corresponding to that of FIGS. 1 and 2, which has been successfully built. The obviously noncritical height of lower part 30 was approximately 1¼ inches, and the diameter of this part was 1 inch. The height of the upper part 50 was 0.57 inch; the original diameter of the outer cylindrical surface thereof was 1 inch, with vertical flat surface 52 lying along a plane which is 0.146 inch inward from being a tangent to the original cylindrical surface. Thus a perpendicular drawn from the midpoint of plane surface 52 would be 0.854 inch in length before reaching the diametrically opposite part of the undisturbed outer cylindrical surface. Slit 60 had a vertical height of 0.118 inches and a horizontal width of 0.016 inch at the narrowest part adjacent bore 56. Because the upper, lower and both sidewalls defining slit 60 are inclined (by about 30°) to the horizontal optical axis 40 in FIG. 2, the slit height and width increase to about 0.15 and 0.05 inches, respectively, at surface 52. Bore 56 had an approximate internal diameter of 0.11 inches. When the cell is assembled, the polished surface 48 of stud 46 is approximately 0.05 inches below the bottom of the slit 60 and the sample material extends approximately the same amount above the top of the slit when it is properly tamped down. Thus only a cylinder of compacted sample having a diameter of about 0.11 inches and a height of about one-fourth inch is required for analysis in the exemplary cell just described. Thus, the relatively small diameter of bore 56 (and of course of the irradiating laser beam that enters this bore) not only assures a high irradiation flux density, but also reduces the amount of solid sample material required for analysis.

The moderate (vertical) depth of the sample not only assists in minimizing the total quantity of sample required, but also reduces the attenuation of the exciting laser beam passing through the sample. The reflective surface at 48 increases the effective radiation flux density, and has the greatest effect at the lower end of the sample, which otherwise would receive the least radiation. Thus this reflective surface tends to make the radiation intensity more uniform throughout the sample, as well as increasing the intensity level in general.

Not only is the irradiation flux density increased by the use of a small bore diameter, and the matching small diameter of the (laser) irradiation beam; but also the small bore diameter causes the reflective wall surfaces to conserve a greater part of the irradiation beam since there is a much lessened attenuation because of shorter paths through the sample. Similarly the small bore diameter reduces the mean path (through the sample) that the Raman reradiation must travel before reaching the exit slit, thereby reducing its attenuation by the sample.

Although a specific embodiment of the invention has been specifically described as required by the patent statute the exact details thereof are not in general necessary to the invention. On the contrary, the invention itself is defined by the appended claims.

I claim:

1. A sample assembly for adapting a Raman spectrometer to analyses of solid samples, comprising:
    means for supporting a solid sample cell within said spectrometer;
    a sample cell attached to said supporting means, having means defining a narrow elongated, solid sample receiving bore therein, open at one end;
    said sample bore being substantially surrounded except at said one open end by highly reflective surfaces;
    and means defining a Raman radiation exit slit in said sample cell, extending generally parallel to but being somewhat smaller in dimension than said sample bore, directly communicating with at least a portion of said sample bore;
    whereby powdered solid sample material may be introduced into said sample bore through said open end, an intense excitation radiation beam may be subsequently caused to enter said same open end, and Raman radiation collected as it leaves said exit slit; and
    said highly reflective surfaces increasing both the effective flux density of said excitation beam within said solid sample, and the proportion of the Raman radiation which eventually leaves said cell through said exit slit.

2. A Raman sample assembly according to claim 1, in which:
    said means for supporting said sample cell additionally comprises means for releasably attaching said supporting means to said spectrometer;
    a Raman radiation collecting subassembly is additionally mounted on said supporting means, in optical alinement with said sample cell exit slit;
    whereby the entire assembly of supporting means, sample cell and Raman radiation collecting subassembly may be readily attached and removed from said spectrometer, so that different types of samples may be readily analyzed in succession.

3. A Raman sample assembly according to claim 1, in which:
    said sample cell comprises two separable parts;
    one of said parts containing all the wall surface defining the side portions of said sample bore; and
    whereby cleaning of the sample bore is greatly facilitated.

4. A Raman sample assembly according to claim 3, in which:
    the other of said two separable sample cell parts comprises stud means entering into and forming the closed end of said sample receiving bore means; and
    the portion of said stud effectively forming said closed end of said bore comprising a highly reflective surface.

5. A Raman sample assembly according to claim 3, in which:
    the other of said two separable sample cell parts and said supporting means comprise means for readily detaching said other part from said supporting means; and
    whereby both parts of said sample cell may be readily interchanged for similar parts.

6. A Raman sample assembly according to claim 3, in which:
    said one part is of the general form of a solid cylinder from which a portion has been removed by a plane parallel to the cylinder axis and spaced therefrom a distance slightly less than the radius of the cylinder;
    thereby forming a flat exterior surface parallel to said cylinder axis;
    said elongated sample-receiving means extends parallel to said cylinder axis, and has its adjacent wall surface only slightly interior of a central part of said flat exterior surface; and
    said Raman radiation exit slit means comprises means defining a cooperating open passage between said adjacent wall surface of said bore and said central part of said flat exterior surface.

7. A Raman sample assembly according to claim 1, in which:
    said Raman radiation exit slit defining means comprises upper opaque means defining the uppermost edge of said exit slit, and lower opaque means defining the lowermost edge of said exit slit;
    said upper and lower opaque means being spaced apart a distance at least slightly less than that longitudinal portion of said sample bore which is normally filled with said powdered solid sample material; and
    whereby much of the Tyndall and Rayleigh scattered radiation occurring at said upper and lower surfaces of said powdered solid sample material is blocked by said upper and lower opaque means from leaving through said exit slit.